Nov. 28, 1933.  O. G. RIESKE ET AL  1,936,688
SKINNING MACHINE
Filed Sept. 29, 1930    2 Sheets-Sheet 1
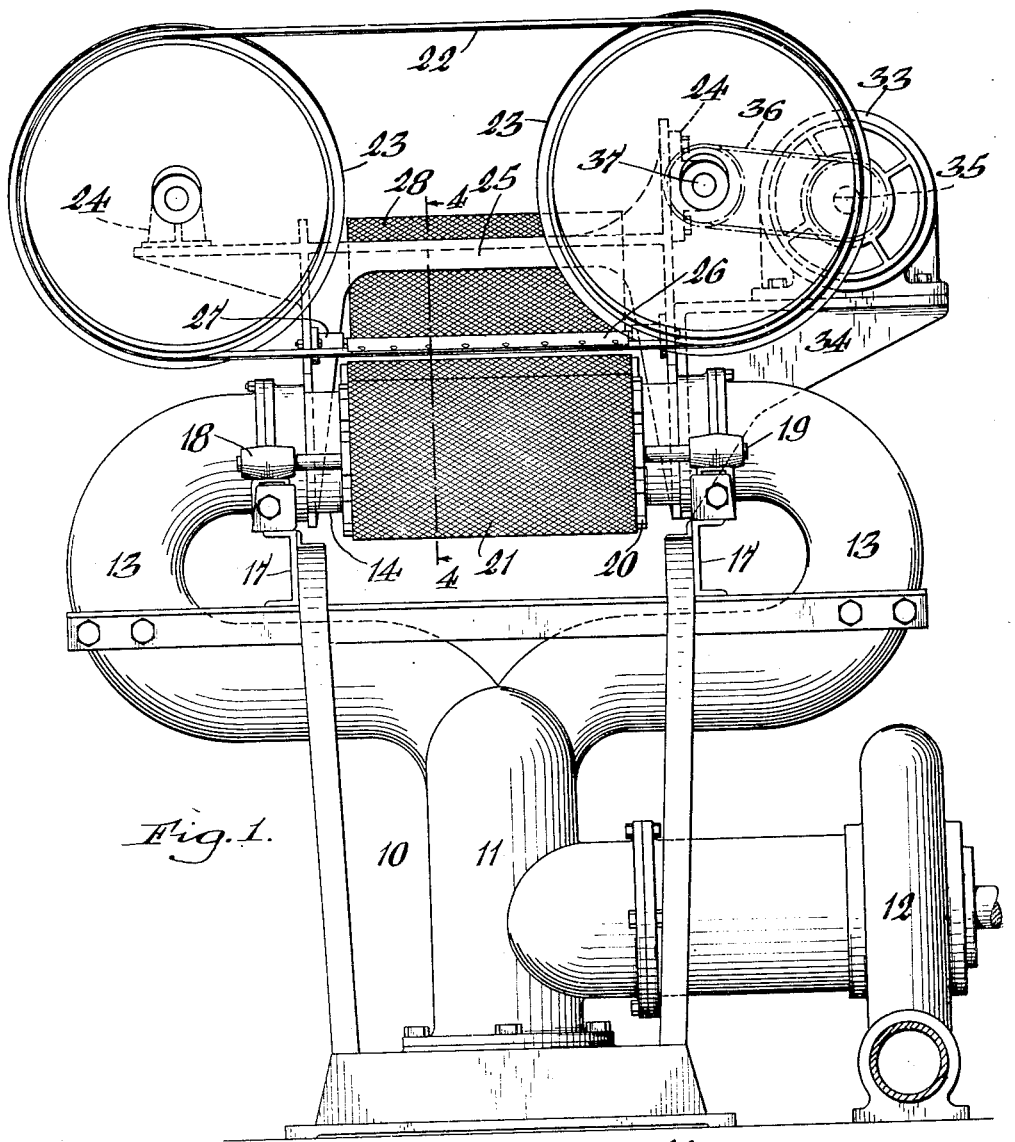
Fig. 1.
Fig. 2.
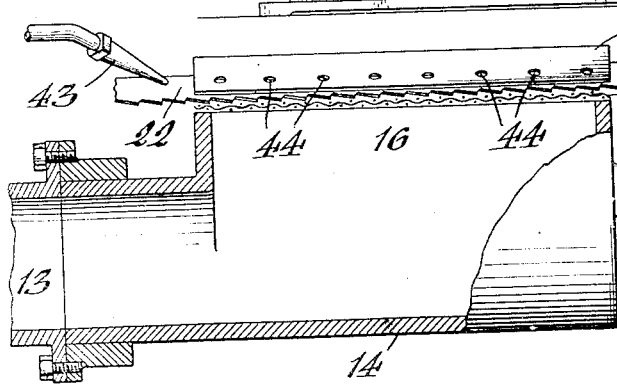
Inventors,
Otto G. Rieske,
Alfred G. Rieske,
by Walter P. Geyer
Attorney.

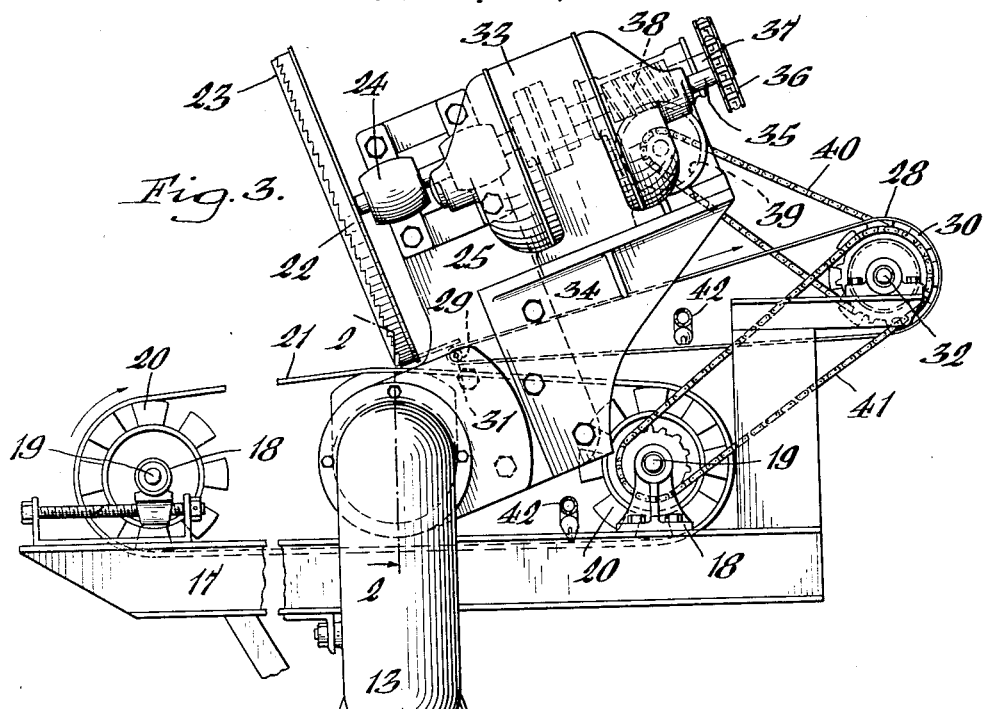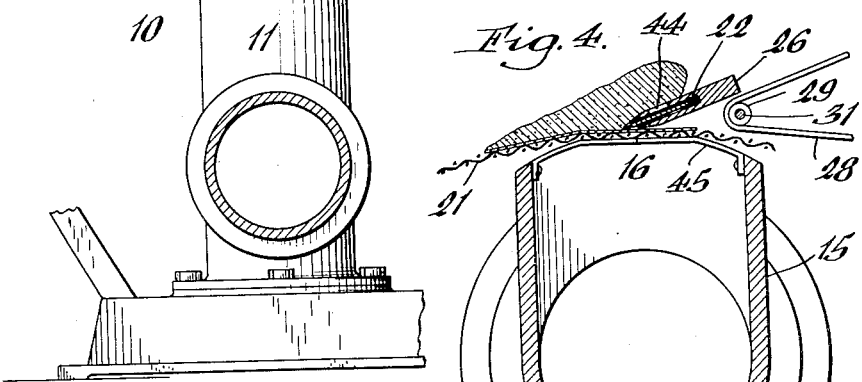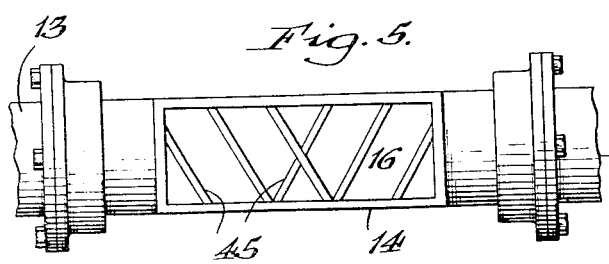

Patented Nov. 28, 1933

1,936,688

UNITED STATES PATENT OFFICE 1,936,688

SKINNING MACHINE

Otto G. Rieske, Buffalo, and Alfred G. Rieske, Kenmore, N. Y.

Application September 29, 1930
Serial No. 484,966

10 Claims. (Cl. 17—2)

This invention relates to a skinning machine and particularly to improvements in machines designed for skinning fish.

One of its objects is the provision of a fish-skinning machine which is reliable and efficient in operation, and which is provided with novel and effective means for maintaining the fish in position while being presented to the cutting mechanism for skinning.

Another object of the invention is to provide a machine of this character with simple means for maintaining the cutter clean and free from foreign matter.

In the accompanying drawings:—

Figure 1 is a front end view of a machine embodying our invention. Figure 2 is an enlarged fragmentary transverse section taken in the plane of line 2—2, Figure 3. Figure 3 is a side elevation of the skinning machine. Figure 4 is an enlarged transverse section taken on line 4—4, Figure 1. Figure 5 is a fragmentary top plan view of the suction chamber showing the grate bars at the mouth of its opening.

Similar characters of reference indicate corresponding parts throughout the several views.

Referring now to the drawings, 10 indicates the main frame or standard of the machine, which is preferably in the form of an air duct consisting of an upright portion 11 connected to a suction fan 12 and branch portions 13 of substantially U-shape form extending from the upper end of the upright portion, the whole approximating the shape of the letter Y.

The opposing inwardly bent ends of the air duct branches 13 are disposed in horizontal alinement and in spaced relation to receive between them a suction chamber 14 which forms a continuation of said duct-branches. This chamber is supported by and in communication with the duct-branches 13 and is preferably provided in its top side with a radial extension or enlargement 15 containing a port or opening 16 which extends substantially the full length of the chamber and is of a width substantially equal to that of the diameter of such member. Movable relatively to this suction chamber and over the opening 16 thereof is a fish carrier for presenting the fish to a cutter to sever the skin therefrom, the suction in the chamber acting as an adhering force to effectually hold the fish to the carrier while being skinned.

The carrier and cutter mechanism are preferably constructed as follows:—

Supported on the main frame 10 of the machine is an auxiliary or supplementary frame 17 which extends transversely of the main frame on either side of the suction chamber 14 and which is provided adjacent its ends with bearings 18 in which are journaled horizontal shafts 19 having pulley wheels or drums 20 fixed thereon. Passing around these drums is the carrier for the fish consisting of a screen-like or foraminous belt 21 whose upper stretch passes over the opening 16 of the suction chamber in the manner shown in Figures 2, 3 and 4. Disposed transversely over the belt and in the plane of said chamber-opening is a movable cutter consisting of an endless band or blade 22 passing at its ends around pulleys 23 journaled in bearings 24 applied to a bracket 25 rising from the auxiliary frame 17. The lower or operative stretch of this belt passes directly over the belt 21 in line with the chamber-opening 16 and is guided and firmly held in a suitable holder preferably composed of a grooved bar 26, which not only holds the blade in a firm and stiff position with its cutting edge exposed for severing the skin from the body of the fish but which also supports it in a downwardly inclined position relative to the foraminous belt with the cutting edge facing the latter and disposed a sufficient distance above the belt-surface to gage the depth of cut. This blade-guide may be supported in suitable brackets 27, and its top side constitutes a deflector over which the skinned fish travels, the severed skin being carried by the belt 21 to a point where it is released or removed from the same by gravity or otherwise.

Arranged over the rear portion of the foraminous belt 21 and adjoining the corresponding end of the blade-guide 26 is a conveyor 28 on to which the skinned fish are delivered and conveyed to a suitable receptacle for receiving them. This conveyor passes at its ends around pulleys or drums 29, 30 applied to corresponding shafts 31, 32 journaled in suitable bearings attached to the auxiliary frame.

The fish-carrying belt 21, the cutter blade 22, and the conveyor 28 may be driven from any appropriate source of power, that shown in the drawings being preferable and consisting of an electric motor 33 surmounting the auxiliary frame 17 and supported on a bracket 34 secured thereto. The motor-shaft 35 is connected by a chain and sprocket 36 with a shaft 37 on which one of the blade-engaging pulleys 23 is mounted. A worm 38 on said shaft 37 meshes with a worm wheel 39 which is connected by a sprocket chain 40 with the shaft 32 of the conveyor 28, and said conveyor shaft is connected by a sprocket and chain 41 with the adjoining drum-shaft 19 of the foraminous belt 21. Thus, when the motor is started, motion is transmitted to the various moving parts at the speed desired.

To keep the belt 21 and conveyor 28 clean and sanitary, nozzles 42 are located along their path of travel for directing a spray of air and water against them. This arrangement forces any skin, scale or other foreign matter from the belt and keeps the perforations thereof open, so that when it reaches a position opposite the chamber-opening 16 the full effect of the suction may be utilized to retain and cause the fish to adhere to the belt during the skinning operation.

In order to keep the cutter blade 22 clean and free from scale and other foreign matter, a water spray nozzle 43 is disposed over the lower stretch of the blade in advance of the guide 26 and the latter has openings 44 therein for the escape of any foreign matter removed from the blade by the combined action of the water and guide.

To prevent the foraminous belt 21 sagging into the opening 16 of the suction chamber, the mouth of the latter is provided with suitably arranged grate bars 45, as shown in Figure 5.

The conveyor 28 is preferably made of a foraminous material and its receiving end, as shown in Figure 4, is disposed over the adjoining end of the suction chamber opening 16, so that the atmospheric pressure is introduced into said chamber from the top side of the conveyor belt, thereby creating a suction effect to hold the skinned fish-body thereto immediately upon leaving the rear end of the blade-guide 26 and at the same time effectually maintaining the severed skin flatwise on the belt 21 and preventing its being crowded or rolled between the latter and the under side of the guide. The best results have been obtained by having the conveyor travel at a slightly faster speed than that of the belt 21.

We claim as our invention:—

1. A machine of the character described, comprising a suction chamber open at one side, a perforated conveying belt for the fish movable over the open side of said suction chamber, and means for severing the skin from the body of the fish as the same is conveyed by the belt over the open side of the suction chamber, the suction holding the fish to the surface of said conveyor belt while being skinned.

2. A machine of the character described, comprising a suction chamber open at one side, a perforated conveying belt for the fish movable over the open side of said suction chamber, and a movable cutter blade disposed transversely over the conveying belt and opposite the open side of the suction chamber to sever the skin from the body of the fish.

3. A machine of the character described, comprising a frame constructed to form a suction conduit, a member interposed in said conduit to form a continuation thereof and having an opening in its top side, pulleys mounted on said frame at opposite sides of said interposed conduit-member, an endless foraminous belt passing around said pulleys and over the open side of said conduit-member, and a cutter blade movable transversely of said belt and disposed opposite the member-opening.

4. A machine of the character described, comprising a suction chamber, a carrier movable relatively to the latter and having a perforated fish-receiving surface adapted for communication with said suction chamber, means for severing the skin from the body of the fish as the same is delivered by the carrier over the suction chamber, and conveying means disposed over the carrier and rearwardly of said severing means for receiving the fish-bodies after being skinned.

5. A machine of the character described, comprising a movable carrier for the fish, means for holding the skin-side of the fish in contiguous relation to the surface of said carrier, an endless cutter blade disposed transversely over the carrier for severing the skin from the body of the fish, a guide for supporting the blade at an acute angle to the surface of said carrier and for directing the skinned fish-body thereover, and a conveyor disposed over the carrier and rearwardly of the blade-guide for receiving the skinned fish-bodies.

6. A fish skinning machine, comprising a movable carrier for the fish, means for holding the fish on the carrier while being skinned, a cutter blade movable transversely over the carrier for severing the skin from the body of the fish, and a guide between which the blade travels as it passes over the carrier, said guide having openings therein for the displacement of any foreign matter lodged on the blade.

7. A fish skinning machine, comprising a movable carrier for the fish, means for holding the fish on the carrier while being skinned, a cutter blade movable transversely over the carrier for severing the skin from the body of the fish, a guide between which the blade travels as it passes over the carrier, said guide having openings therein for the displacement of any foreign matter lodged on the blade, and fluid-spraying means disposed over the blade in advance of said guide.

8. A machine of the character described, comprising a movable carrier for the fish, means for holding the fish on the carrier while being skinned, a cutter blade movable transversely over the carrier for severing the skin from the body of the fish, a conveyor disposed over the carrier and rearwardly of said cutter blade for receiving the fish-bodies after being skinned, and fluid-spraying means disposed in operative relation to said carrier and said conveyor for keeping such parts free from foreign matter.

9. A machine of the character described, comprising a suction chamber, a carrier movable relatively to the latter and having a perforated fish-receiving surface adapted for communication with said suction chamber, means for severing the skin from the body of the fish as the same is delivered by the carrier over the suction chamber, and a conveyor disposed over the carrier and beyond said severing means for receiving the fish-bodies after being skinned, said conveyor being made of a foraminous material and having its receiving end in communication with said suction chamber.

10. A machine of the character described, comprising a suction chamber, a carrier movable relatively to the latter and having a perforated fish-receiving surface adapted for communication with said suction chamber, means for severing the skin from the body of the fish as the same is delivered by the carrier over the suction chamber, a conveyor disposed over the carrier and beyond said severing means for receiving the fish-bodies after being skinned, and means for driving said conveyor at a faster speed than said carrier.

OTTO G. RIESKE.
ALFRED G. RIESKE.